United States Patent
Wu et al.

(10) Patent No.: US 6,332,077 B1
(45) Date of Patent: Dec. 18, 2001

(54) INTELLIGENT ROAMING IN AGV APPLICATION

(75) Inventors: Chi-Kai Wu; Yi-Shou Hsu, both of Hsinchu (TW)

(73) Assignee: National Datacom Corporation, Hsinchu (TW)

( * ) Notice: Subject to any disclaimer, the term of this patent is extended or adjusted under 35 U.S.C. 154(b) by 0 days.

(21) Appl. No.: 09/363,548

(22) Filed: Jul. 29, 1999

(51) Int. Cl.[7] .................................................. H04Q 7/20
(52) U.S. Cl. ..................... 455/432; 455/434; 455/435; 370/331; 370/338
(58) Field of Search .................................. 455/432, 435, 455/436, 441, 440, 434; 370/331, 338; 375/132

(56) References Cited

U.S. PATENT DOCUMENTS 5,838,730 * 11/1998 Cripps .................................. 375/272

* cited by examiner

Primary Examiner—Lee Nguyen (57) ABSTRACT

A roaming algorithm for associating a mobile station (STA) with an access point in a wireless LAN system used in an automatic guidance vehicle (AGV) application. Fast roaming is achieved by eliminating a STA's scanning time during the search of the next AP to associate with. To eliminate the scanning time, each AP is pre-configured with its adjacent APs in advance. Whenever an AP is associated with, a mobile station (STA) gets the information of neighboring APs from the currently associated AP. Then, the STA continuously monitors the signal strength of APs in its neighborhood. During roaming, the STA chooses the best AP to associate with without having to scan all the APs.

7 Claims, 8 Drawing Sheets

| DA | SA | Len | Type | ESSID | Alias Name | BSSID | Hopping Set | Hopping Pattern | TSF |
|---|---|---|---|---|---|---|---|---|---|
| 6 | 6 | 2 | 2 | 32 | 22 | 6 | 1 | 1 | 8 (octet) |

INTELLIGENT ROAMING IN AGV APPLICATION

FIELD OF THE INVENTION

The present invention relates to a roaming algorithm in a wireless LAN, and more specifically to a method for associating a mobile station with an access point in a wireless LAN system used in an automatic guidance vehicle (AGV) application.

BACKGROUND OF THE INVENTION

Description of a Wireless Local Area Network (LAN) Systems:

According to the wireless LAN standard (IEEE 802.11), a wireless LAN station needs to connect to an AP (assess point) for accessing a file server or other workstations of a network system. The AP connects distributed systems and a set of basic service areas. It provides the communication between a local station in a wireless LAN and a remote station in another wireless LAN. It also provides the capability of accessing distributed systems for a station.

Figure 1:
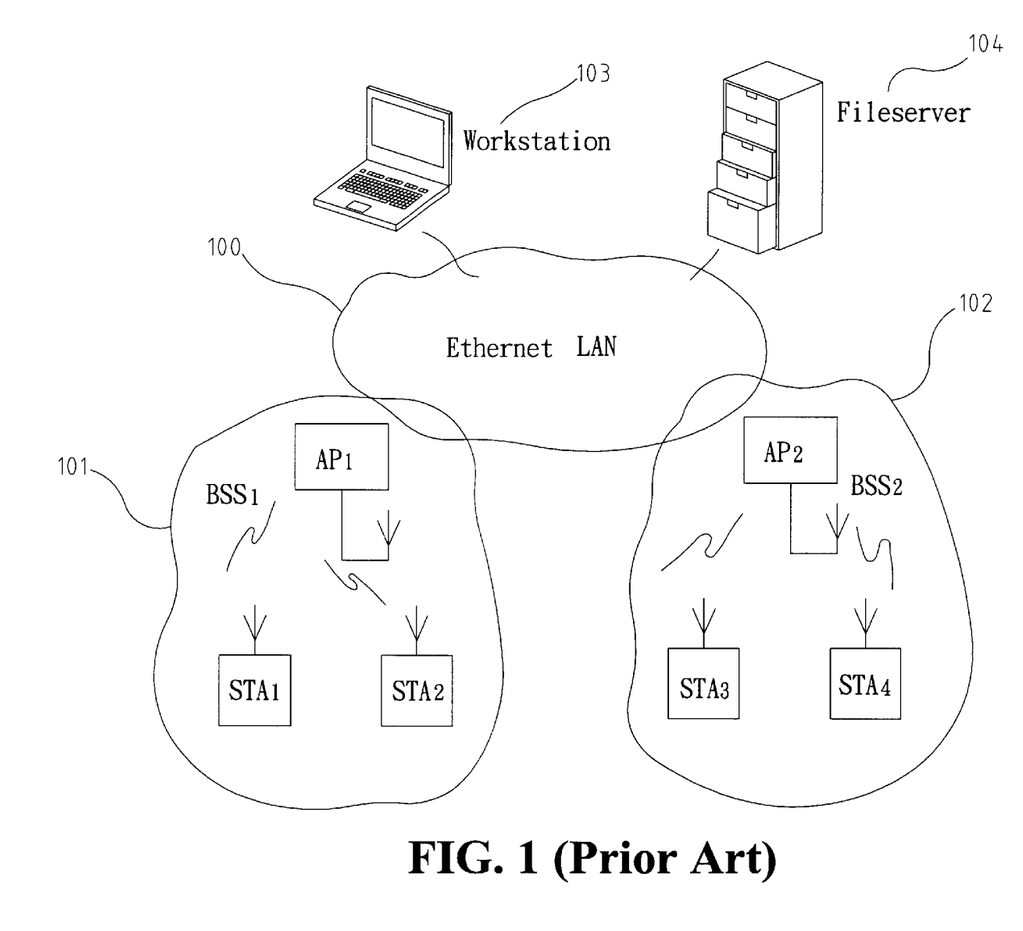
FIG. 1 illustrates the typical hardware architecture for a wireless LAN system.

FIG. 1 shows the typical hardware architecture of a wireless LAN system. As illustrated in FIG. 1, an Ethernet LAN 100 may have two basic service sets 101 (BSS1) and 102 (BSS2), one workstation 103 and one file server 104. Each basic service set comprises one access point and two wireless stations. Basic service set BSS1 includes the access point AP1 and two stations STA1 and STA2. Basic service set BSS2 includes the access point AP2 and two stations STA3 and STA4. Each wireless station should associate itself with one AP before it can communicate with the file server 104 or the workstation 103 in the Ethernet LAN 100.

When a wireless LAN station is powered on, it first looks for an AP. After it finds an AP, the wireless LAN station registers itself with the AP. The station can then synchronize with the AP and, thereafter, transmit and receive information packet to and from the AP.

Figure 2:
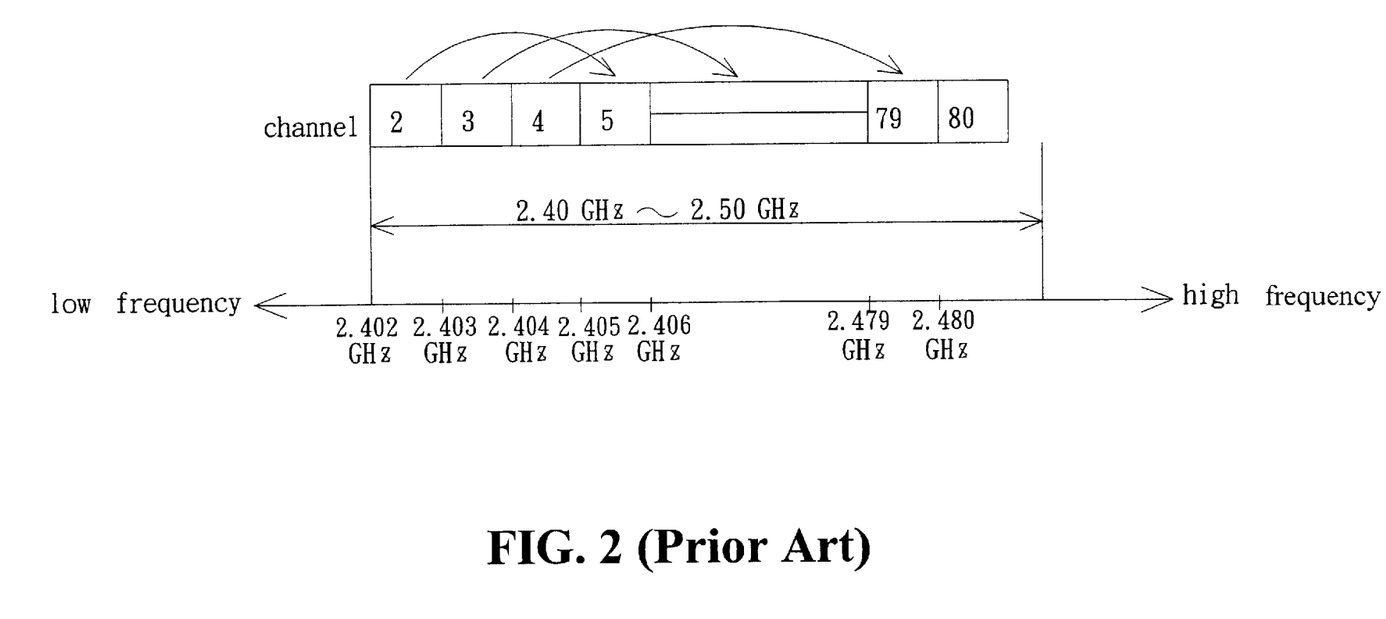
FIG. 2 illustrates that the radio signal shall hop among 79 channels within the frequency band between 2.40 GHz~2.50 GHz in the U.S. and Canada areas according to IEEE 802.11 standards.

According to the wireless LAN standard FHSS (Frequency Hopping Spread Spectrum) (IEEE 802.11), the bandwidth used in the RF (radio frequency) is between 2.40 Ghz and 2.50 Ghz among 79 channels in the US and Canada areas. The frequency hopping radio signal shall hop in the frequency band between 2.40 Ghz and 2.50 Ghz as shown in FIG. 2. The AP shall be the timing master and shall perform the TSF (timing synchronization function) to keep the timers for all wireless stations in the same BSS synchronized. For each channel, the AP shall periodically transmit special frames called beacons each containing a copy of its TSF timer and hopping sequence to synchronize other wireless stations in a BSS. The AP shall broadcast a generated beacon frame at a fixed time interval referred to as a beacon interval. A receiving wireless STA shall always accept the timing information in beacons sent from the AP servicing its BSS. If a wireless STA's TSF timer is different from the timestamp in the received beacon frame, the receiving wireless STA shall set the value of its local timer to the received timestamp value.

Traditionally, when an AP is powered on in a basic service set, it periodically broadcasts a beacon frame to all wireless STAs in the service set. The beacon frame contains the information for synchronizing with the AP and the information is referred to by the wireless STA looking for the AP. Because the beacon interval used in the traditional approach is long (100 mini seconds), it could increase the search time when wireless STA is looking for the AP.

A wireless LAN station needs to do a registration before it can communicate with an AP. According to 802.11 standard, the registration should include two phases. The first phase is authentication. This process is used to identify whether the station has the legal right or not to access the wireless network via a medium access control (MAC) layer. After the authentication is passed, the station needs to establish a connection link with the AP by sending an association request packet to the AP and waiting to receive a response frame from the AP which acknowledges the association.

Figure 3:
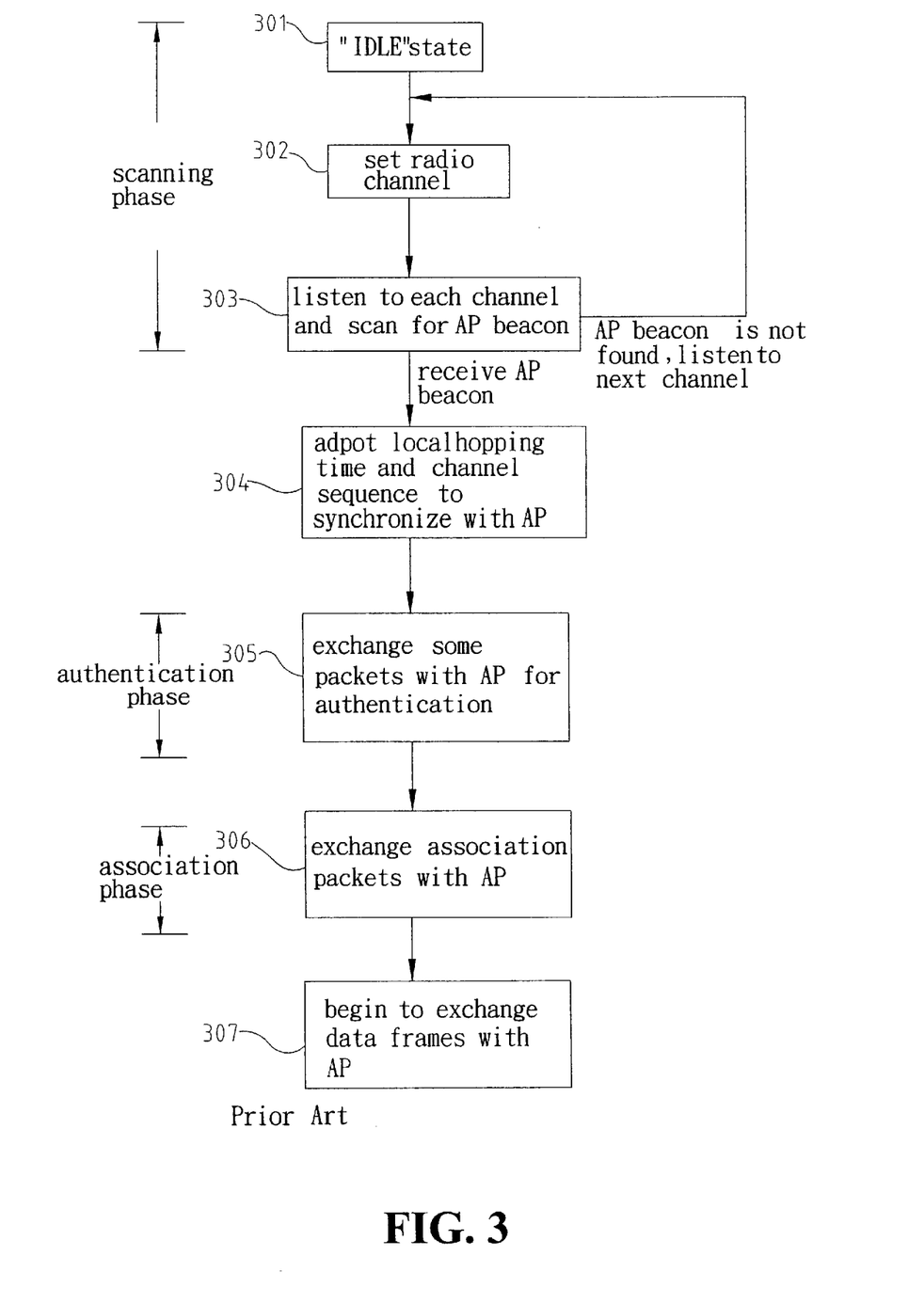
FIG. 3 illustrates the general steps taken by a traditional MAC sub-layer management architecture for a wireless STA from search to registration with an AP.

The general steps taken by a traditional MAC sub-layer management architecture for a wireless STA from search to registration with an AP are shown in FIG. 3. According to the design of FIG. 3, a wireless STA shall perform the three phases: scanning phase, authentication phase and association phase.

In the scanning phase, all IEEE 802.11 STAs initially start from "IDLE" state (step 301). The radio hopping channel shall be set by the hardware (step 302). To search for the AP, a wireless STA shall listen in each channel and scan for any beacon frame transmitted by the AP (step 303). Upon finding the channel and receiving the AP beacon, the scanning phase is completed. Otherwise, the wireless STA shall listen in the next channel and return to step 302. A new radio hopping channel shall be set.

After receiving the AP beacon, the receiving wireless STA will join a BSS by setting its local hopping time and channel sequence according to the information contained in the AP beacon (step 304) in order to maintain synchronization with the AP. The remaining steps constitute the authentication phase and association phase.

In the authentication phase, IEEE 802.11 in general requires bi-directional authentication. At step 305, the wireless STA exchanges some packets with the AP for authentication. It may further include three steps of assertion of identity, challenge of assertion and response to challenge.

In the association phase (step 306), the wireless STA exchanges the association packets with the AP to accomplish the AP registration. The communication link between the wireless STA and the AP is thus setup. The wireless STA can start exchanging data frames with the AP (step 307).

Because the radio frequency hops between 2.40 Ghz and 2.50 Ghz, a wireless LAN station may take a long time to find an AP among the 79 channels in Federal Communications commissions (FCC) regulation.

Each frame used in authentication and association should be sent in complying with the rule of to 802.11 standard (Carrier Sense Multiple Access with collision Avoidance, CSMA/CA). The time consumed for a wireless station to complete all the processes of authentication and association may vary greatly, and is unpredictable, especially when the traffic in the wireless medium is busy. Therefore, the total time from searching for an AP to accomplish the registration is unpredictable for the wireless LAN stations that comply with 802.11 standard.

From the foregoing discussions of prior arts, it can be seen that the disadvantages as pointed out earlier make the conventional access scheme inappropriate for a wireless LAN station to connect with an AP. There exists a strong need for having a more efficient access scheme for the wireless LAN station to quickly access a wireless LAN through an AP.

DESCRIPTION OF PROBLEM IN THE PRESENT INVENTION

In general, the wireless LAN is used in a working field. A vehicle travels along a predetermined track through a plurality of BSS. NDC's existing roaming algorithm can not support the application need for AP's hand over (switching the radio connection from the current AP to the next one which is similar to cellular phone application) without delay. Due to AGV's (Automatic Guidance Vehicle) mobility, this delay is critical to its application in the factory. For example, if the search time for each channel is 200 mini seconds, since there are 80 hopping channels, totally, an average time of 8 seconds is required for an AGV to establish a connection with the AP in the following BSS. This delay is a long period of time. Often, in this time interval, the vehicle has traveled through a long distance. The result is that some messages can not be communicated between the AGV and other control unit. If the work is strictly controlled from a remote controller, then the work can not be continued. Therefore, not only the work process is not successful but also dramatic fault may be generated.

Therefore, an intelligent roaming algorithm is desperately needed to resolve this issue. Thereby, by this roaming algorithm, we hope the search time during handing over from one BSS to another BSS may be reduced greatly.

SUMMARY OF THE INVENTION

Accordingly, the objective of the present invention is to provide an intelligent roaming algorithm to support the handing over of an access point (AP) in a wireless LAN system used in an automatic guidance vehicle (AGV), wherein the AGV travels in a pre-defined route. The key to achieve the fast roaming is by eliminating STA's scanning time in search of the next AP to roam to. To achieve the elimination of scanning time, each AP needs to be pre-configured with its adjacent APs in advance. During associations, STA could get the information of neighboring APs from the currently associated AP. Then, STA will continuously monitor the signal strength via APs in its neighborhood. During roaming, STA can choose the best AP to associate with without the need to scan all the channels.

DETAILED DESCRIPTION OF THE PREFERRED EMBODIMENTS

1. Introduction

The algorithm of intelligent roaming of an wireless LAN system will first be described. The system configuration will also be described at the end of this document.

Those skilled in the art should understand that the description is just as an embodiment, thereby, users may fully understand the present invention by this description. Moreover, those skilled in this art may modify the embodiment in other system within the scope and spirit of the present invention defined in the appended claims.

2. Objective

In a conventional system, a mobile station needs to scan every channel (max. 79 in FCC regulation domain) to find a suitable AP to associate with in roaming. For some time critical applications, the long scanning time can't be afforded. Hence, a new algorithm is created to shorten the roaming time to achieve the requirement of time critical applications.

In addition to fast roaming, this design allows a roaming STA to move freely in any direction when it leaves the coverage of the associated AP. It will be more flexible to apply this system in the real world application. Besides roaming, this implementation also improves the search algorithm for a boot up STA. With this revised algorithm, a boot up STA could always find the best AP to associate with.

3. Algorithm

This section briefly describes the intelligent roaming algorithm that shortens the roaming time. The key to achieve the fast roaming is by eliminating STA's scanning time in search of the next AP to roam to. To achieve the elimination of scanning time, each AP needs to be pre-configured with its adjacent APs in advance. During associations, STA could get the information of neighboring APs from the currently associated AP. Then, STA will continuously monitor the signal strength via APs in its neighborhood. During roaming, STA could choose the best AP to associate with without the need to scan all the channels.

The algorithm comprises five parts that are described in the following subsections respectively.

3.1. Synchronization

The subsection explains how these APs, which incorporated with the intelligent roaming function, synchronize their TSF time through Ethernet. In addition, the design also includes a backup algorithm to resolve the case when the timing master hanged up.

(1) There should be an AP pre-configured as the TSF timing master via the NMS (network management system) program. After being started, the master AP will broadcast its TSF time periodically through Ethernet network that can allow other APs to update their TSF time to synchronize with the master AP continuously.

(2) All the other APs, called as slave AP, can not start their wireless BSS until they receive the TSF time from the master AP. Then, after adopting their TSF time to be the same as the master, the slave AP can start their BSS. After that, the slaved APs need to adjust their local timer to keep the synchronization with the master AP dynamically when receiving the TSF time from the master AP. With this scheme, all the APs and STAs can make their TSF time synchronized. Note that according to the 802.11 standard, the AP and its associated STAs could synchronize their TSF time through the wireless Beacon frame periodically.

(3) Besides the master AP, called as primary-master from now on in this disclosure, a secondary-master AP can be configured by NMS program as well. If the secondary-master is configured and the primary-master hangs up, the secondary-master AP will be the backup master, which will broadcast its TSF time periodically to make the system timing synchronized.

3.2. Neighboring APs

This subsection describes the algorithm on how each AP collects the information respective to its neighboring APs and how the STA gets the information.

(1) Each AP should be configured with its adjacent APs by NMS program in advance.

(2) All APs that exist in the same sub-net should know the information about each other's hopping pattern and hopping set. To achieve this requirement, each AP will broadcast its hopping information to Ethernet periodically.

(3) After started and synchronized, APs will then collect the hopping information of their neighboring APs by receiving the broadcast frame described in (2), and update received information to their database. As a result, each AP would hold the most updated hopping information of its adjacent APs in the same subnet by exchanging the information through the Ethernet network.

(4) In association, STA will request the hopping information of the neighboring APs from the presently associated AP first. Whenever AP receives the association-request from the STA, it will respond with the hopping information of its neighboring APs in association-response frame to STA. Therefore, after association is completed, the STA will know the hopping information of the APs located in its neighborhood.

3.3. Sniffing the Beacon of Neighboring APs

Figure 4:
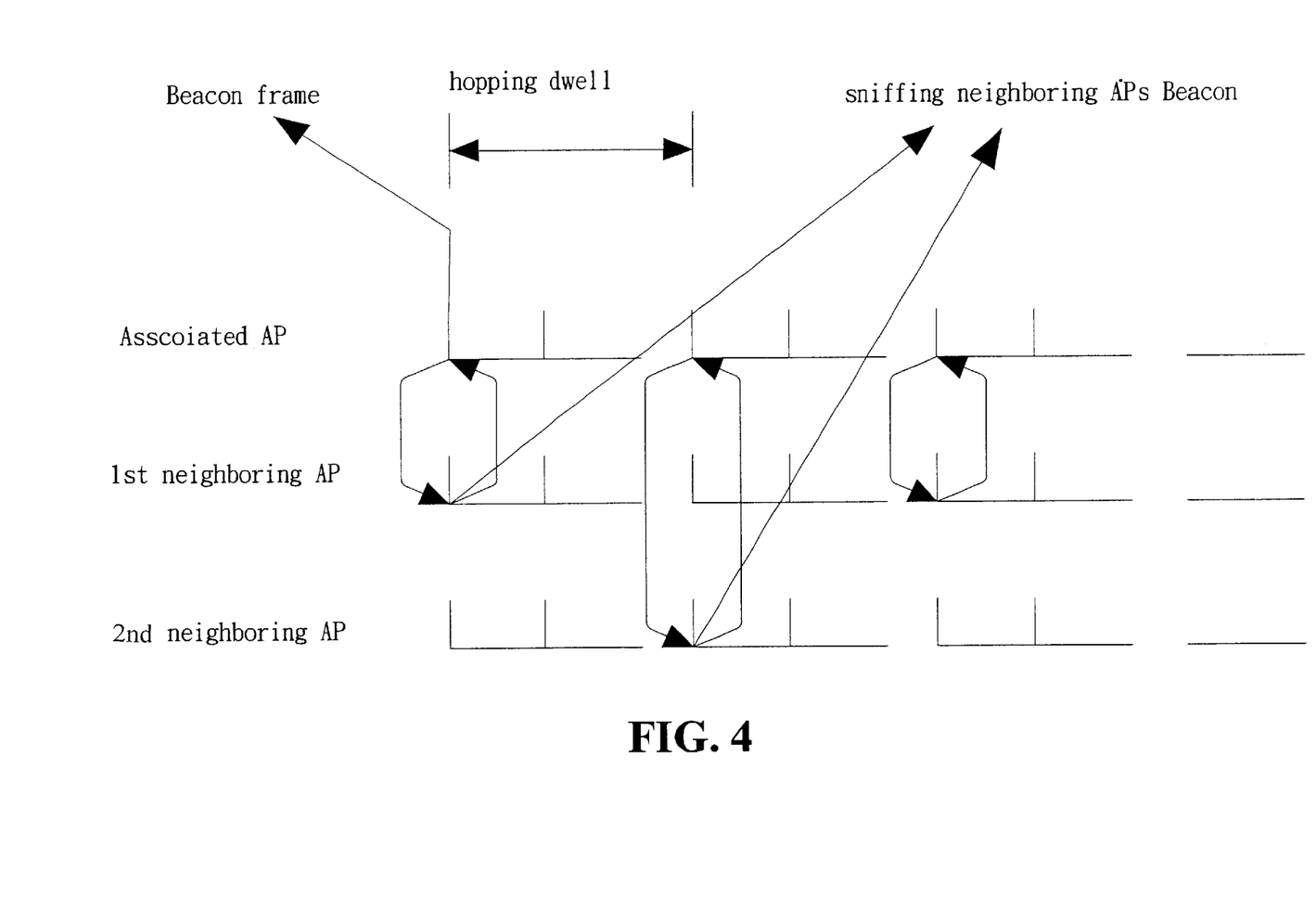
FIG. 4 shows the sniffing process in the present invention.

With reference to FIG. 4, after being associated with an AP, STA has gotten the hopping information of its neighboring APs. It will then sniff the Beacon of its adjacent APs continuously. It will also save the RSSI (Received Signal Strength Indicator) value of the collected Beacon, which will be referenced when STA is roaming, to its database. Note the RSSI value of the received Beacon can be used as an indication of the relative distance between the STA and the neighboring AP. If the RSSI value is larger, the distance between the STA and AP is shorter. Therefore, when roaming, STA always chooses the AP with best RSSI value to associate with. Following paragraphs describe the sniffing in detail.

(1) If the hopping dwell time is set to the value to multiple number of Beacon intervals, AP will broadcast its Beacon frame at the start of each hopping dwell. Since each AP and STA are synchronized and STA has learned the hopping information of the neighboring APs after association, STA could hop to the channel of its neighboring AP directly and stay for a short period of time to listen for the Beacon coming from its neighboring AP. If the Beacon is received during this period, the RSSI value of the received Beacon will be saved in STA's database. FIG. 4 illustrates how a STA hops among its neighboring APs and associated AP to sniff Beacon at every start of hopping dwell.

(2) During the sniffing period, both AP and each associated STA can't transmit the data packets. Only the Beacon frame, sent by AP, can be seen in the air during this period.

(3) STA will continuously sniff the Beacon of its neighboring APs at the start of every hopping channel. Moreover, the order of the sniffing will be done sequentially among the neighboring APs. For example, if there are mulitple APs (AP1, AP2 and AP3) existing in the neighborhood, the sequence o the sniffing will be AP1→AP2→AP3, and then go back the AP1 to continue the sequence again.

(4) STA will keep the RSSI value of the collected Beacon for the last four sniffs respective to each neighboring AP. The value will be referenced when STA is roaming. That means STA could get the most updated information at the moment of roaming.

3.4. Roaming

This subsection explains how a STA decides the best AP to roam among the APs located in its neighborhood. Additionally, it also describes the algorithm that the STA would use if the association of all the neighboring APs failed.

(1) As the algorithm described in the previous subsection, the STA will always keep the RSSI result of the last four sniffing. When the roaming is activated (i.e., the received Beacon quality falls below roaming threshold), STA will first average the RSSI value of the last two sniffing Beacon for each neighboring AP. If no Beacon is received in last two tries of sniffing, STA will refer to the RSSI value of the last 3rd and 4th sniffing results and average their values. This design is for the case that the Beacon frame may be lost by interference. After STA averages the RSSI value of all neighboring APs, it will begin to associate with the AP in the sequence by sorting the averaged values in descending order. Note, if STA can't receive any Beacon frames in the last four tries of sniffing, STA will consider this neighboring AP may not exist and abort the attempt to associate.

(2) If the association of all neighboring APs failed, including the case of losing the Beacon frame in the last four sniffs, STA will begin to scan all the channels to find the best AP to associate with.

(3) Since there is no need to scan AP, the elapsed time of roaming only costs the time to do authentication, association and s/w overhead.

Note: the objective of the intelligent roaming algorithm is to shorten the roaming time. It doesn't guarantee the reception of data packet during roaming period.

3.5. Search AP when Booted up

This subsection describes how a STA finds the best AP to associate to when it is booted up.

(1) When booted up, STA will begin to probe all hopping channels. This behavior is called as active scan in 802.11 standard. If an AP exists in the channel and receives the probe request, it will respond to the STA with the probe response frame. So, after probing all channels, by comparing the RSSI value of the probe response, STA is able to choose the AP with best RSSI value to associate with.

(2) Since AP may hop around when the STA is probing, STA needs to scan all the channels 4 times to make sure that all APs in the area are searched completely.

4. Timing Synchronous to AP 4.1. ETHE-BEACON Frame

As described in section 3.1, the master AP needs to broadcast its TSF time periodically through Ethernet network. A proprietary multicast frame is defined to broadcast the TSF time of master AP. Besides, this multicast frame, called ETHE-BEACON hereafter, can be used to convey the hopping information of AP, mentioned in the section 3.2. Every AP will broadcast this information to Ethernet continuously after launching its BSS.

Figure 5:
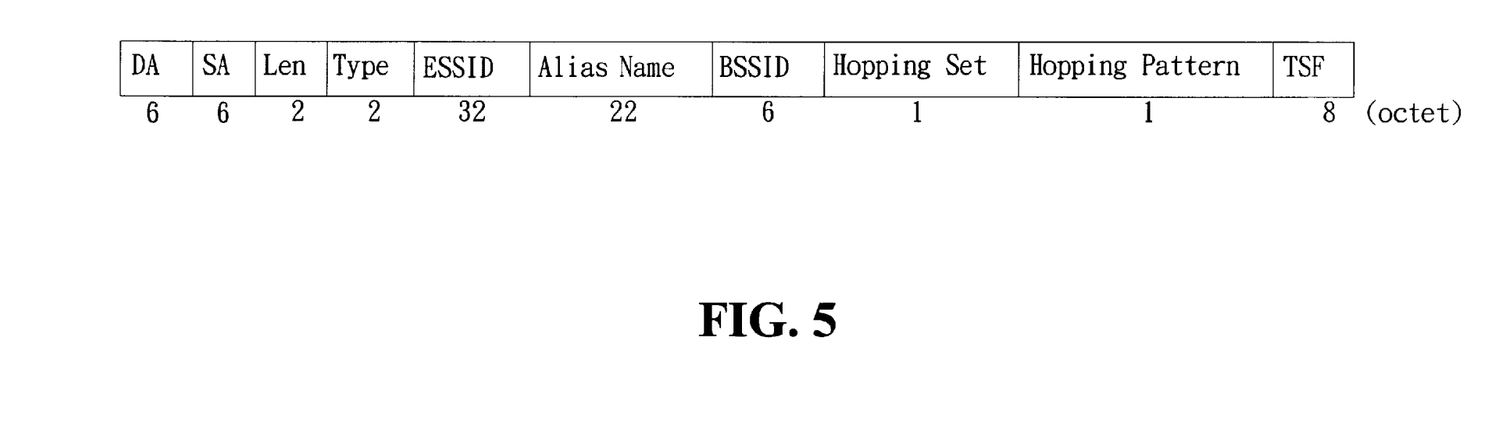
FIG. 5 illustrates an example of an ETHE-BEACON in the present invention.

The format of ETHE-BEACON is illustrated in FIG. 5. In the format, the DA (Destination Address) of ETHE-BEACON frame is set to "03:00:00:00:00:07", that is the same as the roaming notification frame. SA (Source Address) is the Ethernet MAC address of transmitting AP. Len is the byte length of ETHE-BEACON frame and its value is fixed to 72. Type is used to distinguish this MAC frame type from other frames in the network. A propriety value (1234 in hex) is chosen for ETHE-BEACON to avoid duplication with other MAC frame. Alias Name is the AP logical name that can be specified by user using the NMS program. ESSID, BSSID, Hopping Set and Hopping Pattern are the parameters of the wireless hopping information that will be referred by a roaming STA for association purpose. If the ETHE-BEACON is transmitted from master AP, TSF will contain the TSF timestamp of the master AP. Otherwise this field will have zero value in ETHE-BEACON, sent by slave APs.

4.2. Send ETHE-BEACON

When the master AP boots up, it will first send an ETHE-BEACON frame to Ethernet immediately. After that, the master AP will broadcast ETHE-BEACON frame every 10 seconds thereon. Once the slave APs receive an ETHE-BEACON, coming from the master, it will delay a random time and then begin to broadcast its ETHE-BEACON to Ethernet. Like the master AP, the slave AP will send the ETHE-BEACON in 10 second interval after the first ETHE-BEACON is sent.

4.3. ESSID Filtering and Neighboring APs

When AP receives an ETHE-BEACON frame, it will filter out the frame that doesn't match its own ESSID. If the ESSID is the same, the frame content will be stored onto the database. The maximum number of hopping information that one AP can keep in the database is 20 in the current implementation.

Whenever a STA requests the association, AP will filter out its neighborhood AP from the database and then respond the information to STA. The maximum number of neighboring APs that can be set via an AP is 4 in the implementation.

4.4. Aging Timer and Backup Master

An aging timer whose time is set to 60 seconds by default is created for each saved element of the database. The aging timer will be reset whenever AP receives an ETHE-BEACON frame. If there is no ETHE-BEACON received before the aging time expired, the stored element will be deleted.

If the expired entry is the primary master AP, then the secondary master will be assumed to be the backup master that it will continuously broadcast its TSF time by ETHE-BEACON frame. In the case that there is no secondary master configured and the primary master AP expires or both primary and secondary master APs expire, the AP with the smallest hopping pattern will start to broadcast its TSF time as the backup master to maintain the TSF synchronization.

When APs are started, if the primary master AP is hung up to transmit the ETHE-BEACON, the secondary master will begin to send the ETHE-BEACON with its own TSF after 15 seconds.

5. System Configuration

This section highlights the points that should be careful when installing the system with the intelligent roaming function.

5.1. Set APs and Roaming STAs to the Same ESSID

System administrator must set the same ESSID (Wireless Domain name) for all APs that the roaming STA may associate with. The intelligent roaming AP will filter out the ETHE-BEACON frame that holds different ESSID value. If the ESSID is set differently between the STA and AP, then the STA won't be able to receive the AP's hopping information exists in its neighborhood.

5.2. Assign Each AP with a Unique Alias Name and Hopping Sequence

Before configuring AP's neighbors, each AP should be set with a unique Alias Name by NMS program. After the alias name is given, administrator can begin to set AP's neighbors.

Additionally, each AP should be set with different hopping sequence to avoid the case that more than one BSSs might overlap their hopping channels always. Also, the configuration of hopping sequence can be done by NMS program as well.

5.3. Set Neighboring APs by Geographic Location

Since the roaming STA will choose the AP by the RSSI value, it implies that the relative distance between the roaming STA and the neighboring APs should be configured by the their geographic location in the deployment environment.

Figure 6:
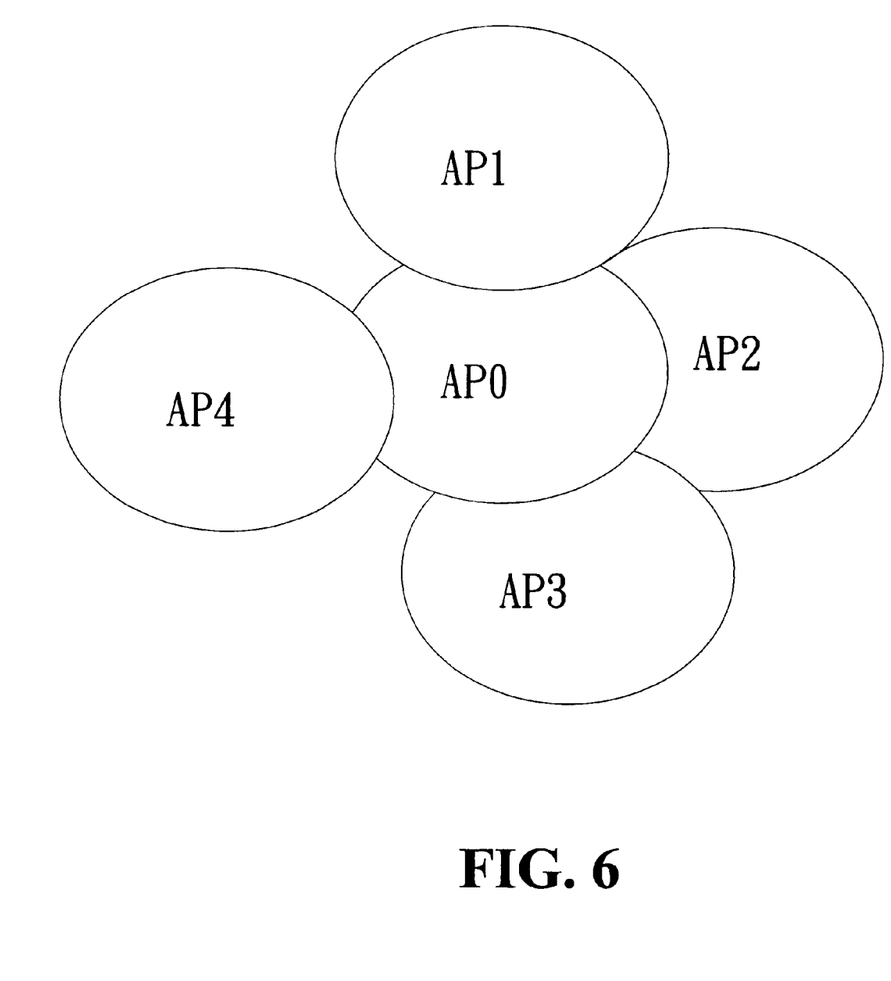
FIG. 6 shows the geographic location of neighboring APs in the present invention.

As shown in FIG. 6, if there are four APs (AP1, AP2, AP3 and AP4) installed around the AP0, with some overlapped signal coverage, AP0 can set AP1, AP2, AP3 and AP4 as its neighbors. Thus, these neighboring APs will be referenced by the roaming STA when it leaves from AP0's coverage.

5.4. Assign the Master AP

For the synchronization issue, system administrator must assign an AP as the primary master in an ESS domain. Beside the primary master, administrator may optionally choose another AP as the secondary master to be the backup for the primary master.

5.5. Connect APs to the Same Ethernet Subnet

Since the ETHE-BEACON frame will be transmitted to the Ethernet network by multicast frame, the intelligent roaming APs should be linked by Ethernet cable and be configured correctly to receive the multicast frame, coming from the same ESS domain.

5.6. Set APs to the Same Hop Dwell Time, Beacon Period and Carrier Set

The wireless hopping information of dwell time, Beacon period and carrier set are not included in the ETHE-BEACON frame. Therefore APs that are set in the same ESS domain, should make sure the value of these parameters are set as the same. These parameters are set to same value when delivering from factory default.

Besides, in order to sniff the Beacon of neighboring AP at the start of every hopping dwell, hopping dwell time must be set to the multiple number of Beacon intervals. Take the factory default setting as the example, the dwell time and Beacon interval is set to 200 ms and 100 ms respectively. With these values, the STA can sniff the Beacon of its neighboring APs successfully.

5.7. Start APs in Ahead of STAs

When the system starts, all APs should be powered on before the STAs are lunched (note, 30 seconds before STAs start). It is because of the fact that AP needs time to do hardware self-test, TSF synchronization and collects the neighboring AP's information. After all these are done, STA could be booted up and then find the best AP to associate with and be able to receive the hopping information of its neighboring APs.

5.8. AP Coverage

To provide the network connectivity for a roaming mobile STA, the neighboring APs must be installed with some overlapped coverage.

Figure 7:
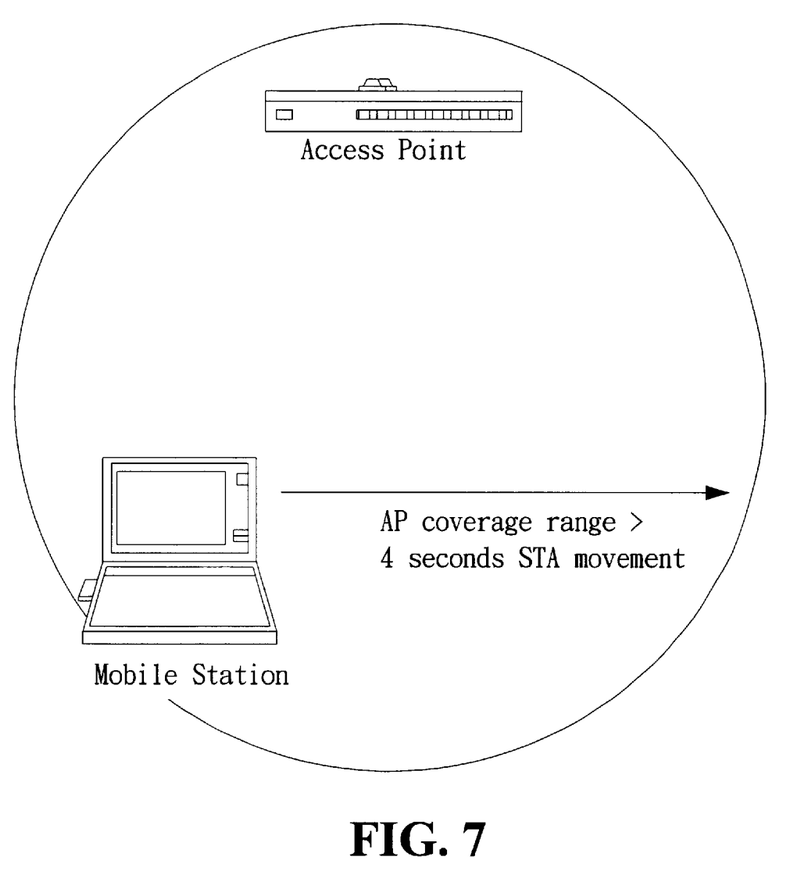
FIG. 7 shows an AP coverage according to the present invention.

The received Beacon quality (that is a percentage value indicating signal quality between the AP and STA) and roaming threshold (configurable parameter) will determine roaming coverage and the time to roam. For example, once the Beacon quality of the mobile STA dropped below the threshold, the STA will begin to roam to the next AP. Hence, if a higher threshold is set, the AP's coverage range will be shorter. Moreover, the time of roaming will be quick for the STA. However, the received Beacon quality will be calculated and honored only after the STA is associated with an AP in 4 seconds. Therefore, the system administer should install the AP in signal coverage range that can support a roaming STA with the distance in 4 seconds movement at least. The picture as illustrated in FIG. 7 shows the scenario.

6. Algorithm Summary

The algorithm of the present invention will be briefly described in the following.

Figure 8:
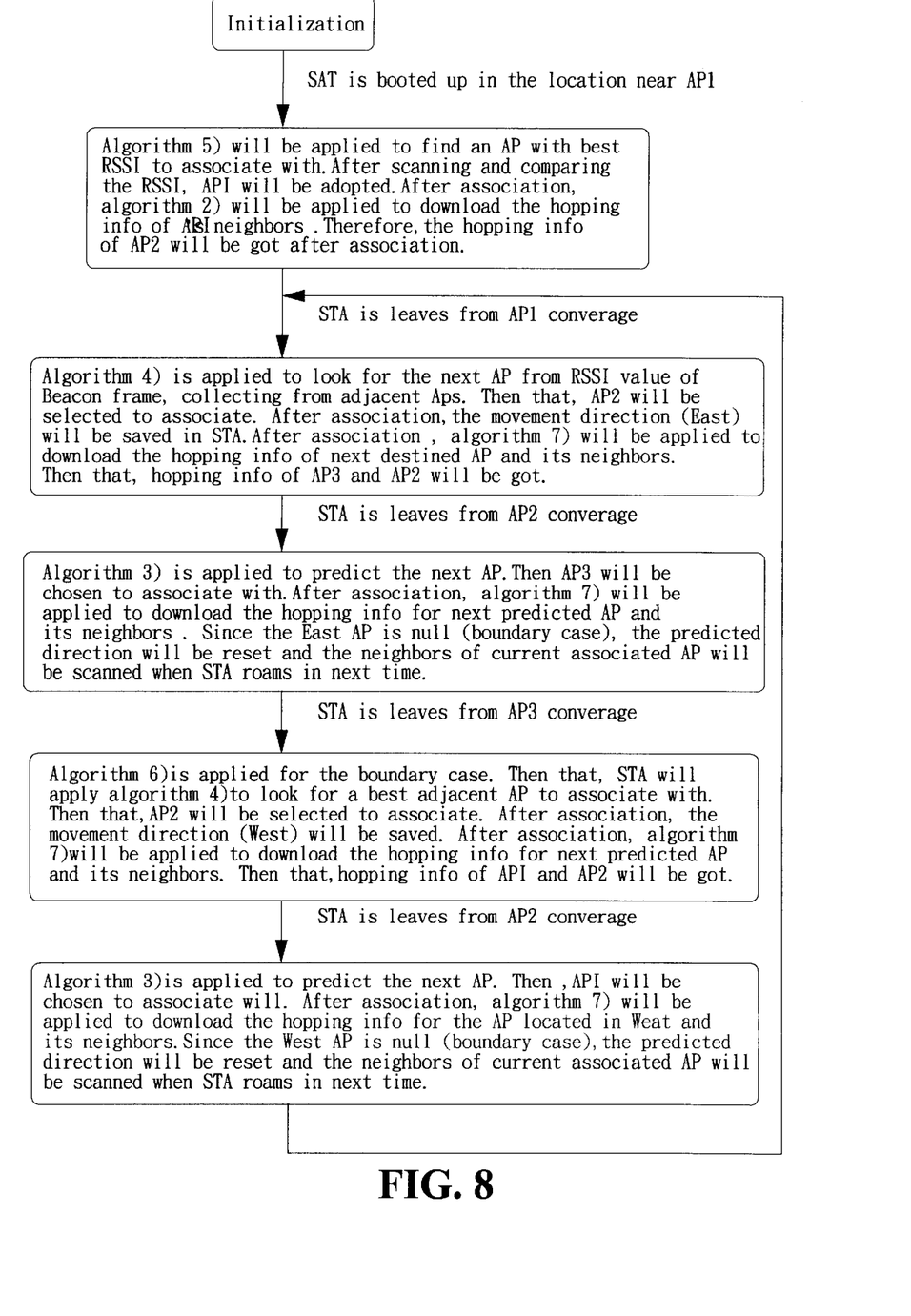
FIG. 8 shows an algorithm of the present invention.

6.1) Each AP needs to be pre-configured with its adjacent APs in advance by its relative location. As shown in FIG.

8, with reference to the AP2, its configuration needs to be set by AP3 in the East, AP1 in the West, AP4 in the North and AP5 is set to the location of the South direction. Whenever AP is booted up, in addition to its own hopping info, it will send the ETHE-BEACON frame, containing its neighboring info as well.

6.2) Whenever a STA is associated with an AP. it may download the hopping information of the adjacent APs from the currently associated AP.

6.3) When roaming is activated, STA will be responsible for making the decision for the next destined AP. There are two cases that STA could decide the roaming route. One is that the roaming STA assumes its movement will go to the same direction as it roams previously. Thus, it could predict the next destined AP. For example, if the STA comes from the West (AP1), it will predict the next destined AP will be in the East (AP3) when it leaves from the currently associated AP (AP2). If the STA is coming from the North (AP4), the next destined AP will be predicted in the South (AP5). This method is suitable for the application that moves in a static route and on a straight line.

6.4) The other situation is that STA may scan the adjacent APs and find the best AP to associate with. The best AP is decided by the RSSI value, collecting from the APs Beacon frame. Since STA has known the hopping info of adjacent APs after association, the scan time will be short in that STA could synchronize to the adjacent AP directly and listens for a Beacon frame. For example, if the Beacon interval is set to 10 ms, the total time for scanning the 4 adjacent APs may take 40–50 ms. This kind of scenarios will be ideal for the STA that may roam in any random direction.

6.5) When booted up, STA needs to scan all the hopping channels to receive APs Beacon frame (passive scan). Then, by comparing the RSSI value of received Beacon, STA may choose the AP with the best RSSI value to associate with. If the Beacon Interval is set to 10 ms. STA may take 2400 ms (3 times of scanning to make sure the all APs are found) to find out the best AP. For the case that AGV may be booted up in the random position of the route, by this method, STA could figure out the best AP to associate with.

6.6) In the case that STA is leaving from the first associated AP, since it has no previous roaming direction to refer to, the STA can only use the method in 6.4) to choose the next AP. After STA has roamed once, the movement direction can be saved and be referred to in the next time. However, when STA reaches boundary (e.g., STA has roamed to AP in the most right side), it could not get the next AP located in the same direction, and thus it will use the method in 6.4) to find the next AP.

6.7) After association, STA will download the hopping info of the next destined AP, which is determined by prediction, and its adjacent APs. The hopping info of neighbors will be used when the next predicted AP is hung up. If this situation happens, the roaming STA will use method in 6.4) to choose the best AP to associate with. Moreover, the direction history will be reset when the predicted AP can not be associated with.

7. An Example

The following description will use a simple example to explain how the roaming algorithm of the present invention as summarized in the previous section is applied. Assuming that a wireless LAN has been initialized and an STA is booted up in a location near AP1, as described in 6.1) an AP with a highest RSSI value is chosen to associate with. After scanning and comparing all RSSI values, AP1 is associated. After the association, the hopping information of AP1's neighboring APs is downloaded according to 6.2). Therefore, the hopping information of AP2 is available after association.

When the STA leaves the area of AP1's coverage, it searches for the next AP from RSSI values of Beacon frames collected from adjacent APs as described in 6.4). AP2 is selected. The moving direction which is East is saved in the STA after AP2 is associated. According to 6.7), it downloads the hopping information of the next destined AP and its neighbors. Therefore, hopping information of AP3 and AP2 is available.

When the STA leaves the area of AP2's coverage, as described in 6.3) it predicts the next AP to associate with and AP3 is chosen. After association, It attempts to download the hopping information of the next predicted AP and its neighbors according to 6.7). Assuming that there is no AP in the East, the predicted direction (East) is reset and the neighbors of currently associated AP are scanned when the STA roams next time.

When the STA leaves the area of AP3's coverage, the boundary case as described in 6.6) applies because there is no AP in the East. Therefore, a best adjacent AP is looked for according to 6.4) and AP2 is selected. After the association, the moving direction (West) is saved and it downloads the hopping information for the next predicted AP and its neighbors according to 6.7). Therefore, the hopping information of AP1 and AP2 is available.

When the STA leaves the area of AP2's coverage, it predicts the next AP to associate with as described in 6.3) and AP1 is chosen. After the association, according to 6.7) it downloads the hopping information for the AP located in the West and its neighbors. Assuming that there is no AP in the West, the predicted direction will be reset. The neighbors of the currently associated AP will be scanned when the STA roams next time. When the STA leaves the area of AP is coverage, the condition is similar to that has been described earlier.

What is claimed is:

1. A method for associating a mobile station (STA) with an access point (AP) in a wireless LAN having a plurality of APs, comprising the steps of:

pre-configuring each AP with its adjacent APs in advance according to relative locations of said plurality of APs;

downloading wireless hopping information of the adjacent APs of a currently associated AP whenever an AP is associated; and selecting a best AP for said STA to associate with when roaming is activated, using a method including the steps of:

a. determining if a roaming direction exists for said STA;

b. selecting an AP from the adjacent APs as the best AP if a roaming direction exists and by associating with the selected AP the same roaming direction can be continued; otherwise c. scanning the adjacent APs and selecting an AP that has a highest received signal strength as the best AP.

2. The method for associating a mobile station with an access point as claimed in claim 1, wherein if the selected AP in step b is hung up or can not be associated with, step c is used to select a best AP.

3. The method for associating a mobile station with an access point as claimed in claim 1, wherein each AP continuously broadcasts a Beacon frame to an Ethernet in the wireless LAN, said Beacon frame comprising hopping set and hopping pattern that are parameters of wireless hopping information.

4. The method for associating a mobile station with an access point as claimed in claim 1, wherein the received signal strength of an AP is the value of the received signal strength indicator (RSSI) of a Beacon frame broadcast by an AP.

5. The method for associating a mobile station with an access point as claimed in claim 4, wherein after said STA has downloaded wireless hopping information of the adjacent APs of a currently associated AP, said STA continuously sniffs the Beacon frames of the adjacent APs and saves the RSSI values of the received Beacon frames.

6. The method for associating a mobile station with an access point as claimed in claim 5, wherein a hopping dwell period is a multiple of Beacon intervals and an AP broadcasts its Beacon frame at the start of each hopping dwell period, said STA being synchronized to each AP for hopping directly to an adjacent AP and staying for a short period to listen for the Beacon frame of the adjacent AP.

7. The method for associating a mobile station with an access point as claimed in claim 5, wherein said STA keeps the RSSI values of the received Beacon frames for last four sniffs corresponding to each adjacent AP.

* * * * *